US011948562B1

(12) United States Patent
Welbourne et al.

(10) Patent No.: US 11,948,562 B1
(45) Date of Patent: Apr. 2, 2024

(54) PREDICTIVE FEATURE ANALYSIS

(71) Applicant: Amazon Technologies, Inc., Seattle, WA (US)

(72) Inventors: William Evan Welbourne, Seattle, WA (US); Min Hao Chen, Seattle, WA (US); Jennifer Liwen Chen, San Diego, CA (US)

(73) Assignee: Amazon Technologies, Inc., Seattle, WA (US)

( * ) Notice: Subject to any disclaimer, the term of this patent is extended or adjusted under 35 U.S.C. 154(b) by 604 days.

(21) Appl. No.: 16/710,756

(22) Filed: Dec. 11, 2019

(51) Int. Cl.
*G10L 15/22* (2006.01)
*G10L 15/26* (2006.01)

(52) U.S. Cl.
CPC ............... *G10L 15/22* (2013.01); *G10L 15/26* (2013.01); *G10L 2015/223* (2013.01); *G10L 2015/227* (2013.01); *G10L 2015/228* (2013.01)

(58) Field of Classification Search
CPC ... G10L 15/26; G10L 15/22; G10L 2015/223; G10L 2015/228; G10L 2015/227; G06N 20/00; G06N 5/04; G06N 7/005; H04L 67/22; H04L 67/2847
See application file for complete search history.

(56) References Cited

U.S. PATENT DOCUMENTS

| | | | | |
|---|---|---|---|---|
| 2016/0147889 A1* | 5/2016 | Lakshmanan | ....... | G06F 16/9038 707/731 |
| 2020/0251101 A1* | 8/2020 | Li | .......................... | G10L 15/30 |
| 2021/0329091 A1* | 10/2021 | Yellin | ................. | H04L 67/2847 |

FOREIGN PATENT DOCUMENTS

WO    WO-2021091546 A1 *  5/2021  ......... G06F 16/9535

* cited by examiner

*Primary Examiner* — Angela A Armstrong
(74) *Attorney, Agent, or Firm* — Pierce Atwood LLP

(57) ABSTRACT

Described herein is a system for predictive feature analysis to precompute and store data required to respond to a user input in advance of receiving the user input. To determine when to precompute the data, the system uses a prediction model to predict user interactions and when to expect the user input. The system predicts that a user input is about to be received, and starts to process certain data to determine feature data and stores the data in a cache. When the user input is received, the system retrieves the data from the cache for further processing to respond to the user input.

18 Claims, 9 Drawing Sheets

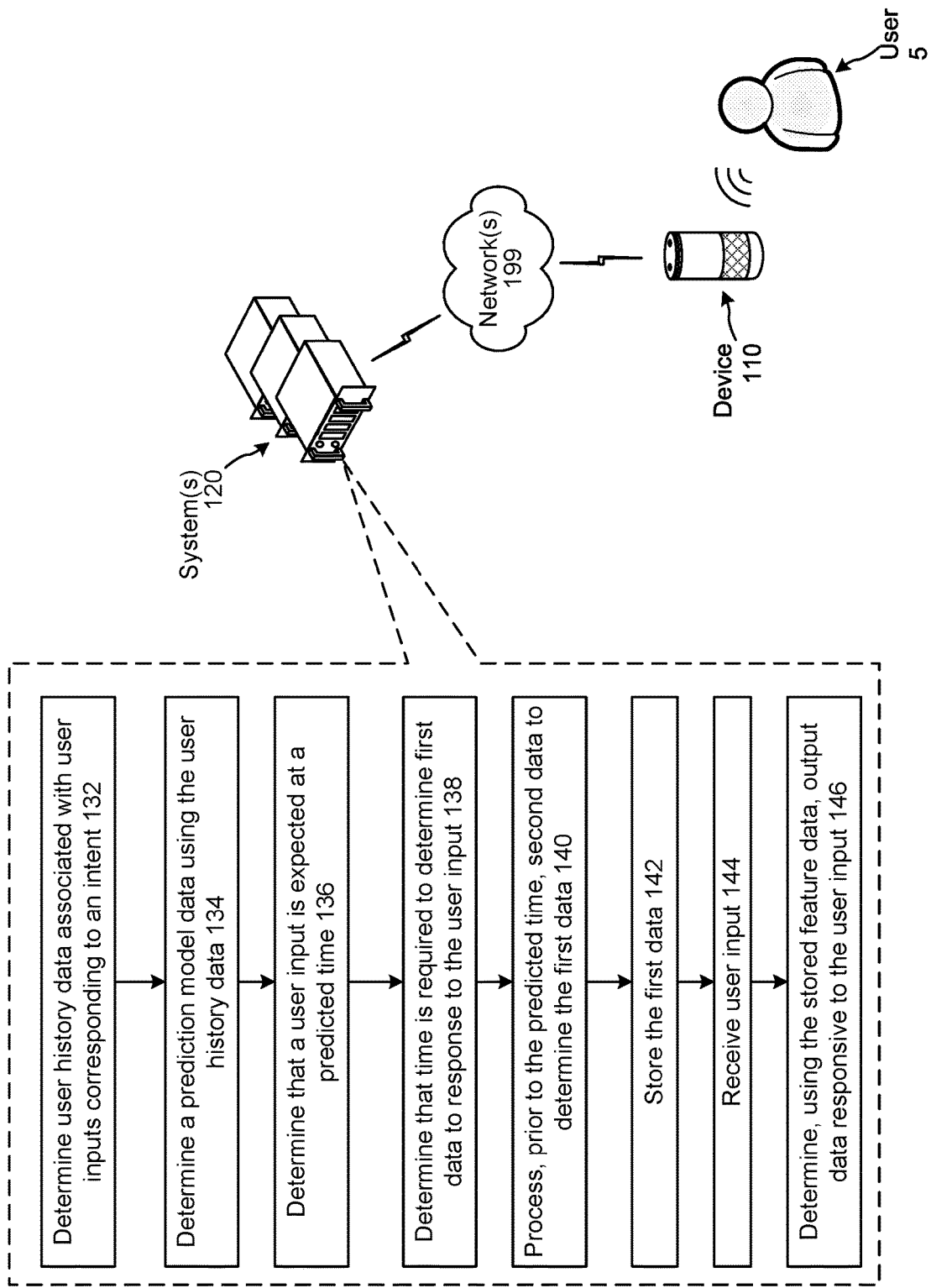

PREDICTIVE FEATURE ANALYSIS

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. The combination of speech recognition and/or natural language understanding processing techniques, or other techniques or combination thereof used to interpret input audio data is referred to herein as speech processing. Speech processing may also involve converting a user's speech into text data that may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 1 illustrates a system configured to process feature data in advance of a user input according to embodiments of the present disclosure.

DETAILED DESCRIPTION

Figure 2A:
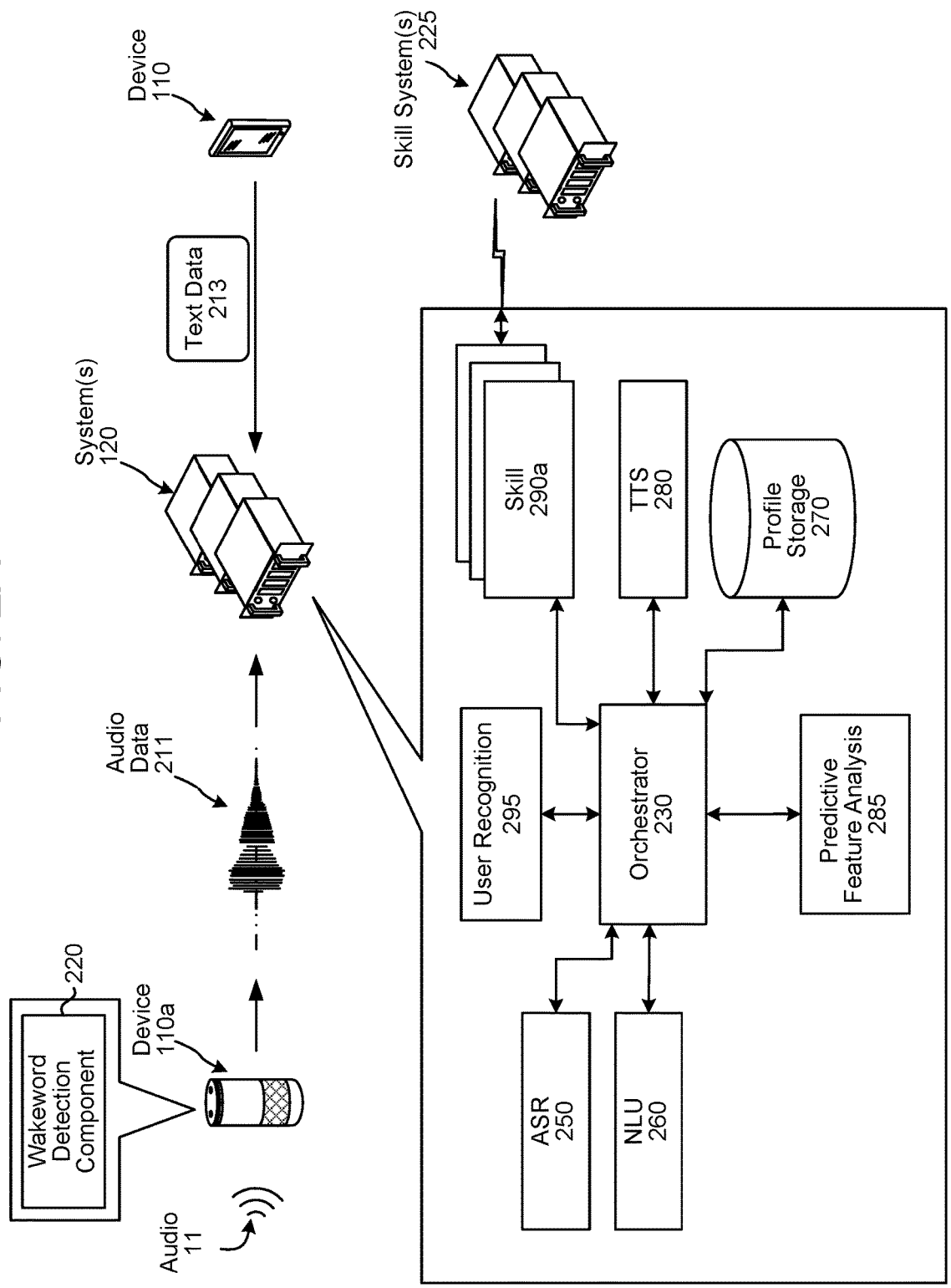
FIGS. 2A and 2B are a conceptual diagrams of components of a system according to embodiments of the present disclosure.

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system. Text-to-speech (TTS) is a field of concerning transforming textual data into audio data that is synthesized to resemble human speech.

Certain systems may be configured to perform actions responsive to user inputs. For example, for the user input of "Alexa, play Adele music," a system may output music sung by an artist named Adele. For further example, for the user input of "Alexa, what is the weather," a system may output synthesized speech representing weather information for a geographic location of the user. In yet further example, for the user input of "Alexa, turn on bedroom lights," a system may cause the lights designated as bedroom lights by the user to turn on.

A system may enable a user to interact with various smart devices within a home using voice input. Such smart devices may include lights in different rooms or areas of the home, washer and dryer machines, toaster ovens, microwaves, thermostats, doorbells, home security systems, and other appliances. In order to respond to a user request, the system needs to determine which device the user intends to operate or otherwise interact with. As the number of smart devices in the user's home increases, the processing time may also increase for the system to determine which device the user wants to interact with. Due to the increase in processing time, in some cases a user may experience some delay in the system responding to the user request. The system may also need to perform certain computations that require time and may cause latency in responding to other user requests.

In some cases, a system may inform a user that a device within the user's home is in a state different than the user's preferred state. For example, the system may determine (based on preferences defined by the user and/or a user's interaction pattern) that the user prefers to have the porch lights on at night. On a particular night, the porch lights may be off, and the system may inform the user of the state of the porch lights. To be able to inform the user of the state of a device, the system may need to perform certain computations ahead of time to be able to realize that the state of the device is not in the preferred state. Such computations may require processing time and can cause a delay in the system informing the user of the device state.

The present system is configured to predicting when a particular user input is expected, and precomputing and storing certain data required to respond to the user input, thus reducing delay in responding to the user input that may be caused by computation latencies.

To anticipate a user's request the system has to understand users' interaction patterns and to reduce user perceived latency in fulfilling complex user requests in real time. To accomplish both, the system employs a machine learning model that analyzes and predicts what the user may need at a certain time and day, which can be used to determine what features to precompute, and when to start precomputing and pre-caching. The results of this interaction prediction model may be augmented with data about what features are needed to fulfill the user request and how long the feature will take to generate. Based on the predicted user request, the system determines how long the feature will take to generate and start precomputing before the user request is expected to be received. The system then stores the feature data into the cache close to the predicted time, and when the user request is received the system retrieves the feature data from storage.

The present system may provide a more desirable user experience. This is due to the system reducing the time to respond to a user's request. The present system may process certain data in advance of a user request and store corresponding features that can be used to generate an output responsive to the user request. Thus, the system reduces the time to respond by using precomputed and pre-cached feature data to respond to the user request.

FIG. 1 illustrates a system configured to process feature data in advance of receiving a user input according to embodiments of the present disclosure. As illustrated in FIG. 1, the system may include a device 110 local to a user 5 and one or more systems 120 connected across one or more networks 199.

The system(s) 120 may generate a prediction model to predict when a particular user request can be expected. If the system(s) 120 predicts with a high level of confidence that a user request associated with intensive computation and/or computational latency is expected at a particular time, then the system(s) 120 precomputes features needed to respond to the user request and stores them in a database. When the predicted time approaches, the system(s) 120 may retrieve the features from the database and store them in a cache. If the user request is received at the predicted time, then the system(s) 120 fetches the features from the cache for further processing in order to respond to the user request. If the user's interaction pattern changes from the predicted pattern (e.g., the user stops providing the user input at the predicted time), then the system(s) 120 updates the prediction model to lower the confidence level of predicting such interaction and user requests, and updates to precompute and store features related to other interaction and user requests that are predicted with a higher confidence level.

The system(s) 120 determines (132) user history data associated with user inputs corresponding to an intent (e.g., an intent to operate a device in the user's home). The user history data may include data relating to past user requests and inputs, where responding to the past user inputs required the system(s) 120 to generate feature data that required significant amount of resources or time. The user history data may include timestamp data indicating when each of the past user inputs were received, location data indicating where the user was located when providing the past user inputs, event data indicating occurrence of one or more events when the user provided the past user input or in response to which the provided the past user input. The user history data may also include other data that can be used by the system(s) 120 to predict when the system can expect the particular type of user input.

The system(s) 120 determines (134) a prediction model using the user history data. The system(s) 120 may process the user history data using one or more trained models to determine the prediction model configured to predict a likelihood of receiving a user input corresponding to a particular intent. Further details of determining the prediction model are described in relation to a prediction component 420 of FIG. 4.

The system(s) 120 determines (136) that a user input is expected in the future at a predicted time. The system(s) 120 may determine a likelihood of receiving a user input corresponding to a particular intent in the future. The likelihood may indicate with a high level of confidence that based on the user interaction pattern/prediction model, the system(s) 120 can expect to receive the user input at a particular time. In some embodiments, the system(s) 120 may determine trigger data that indicates the system(s) 120 is about to receive the user input. The trigger data may include input data representing the present context/situation/conditions relating to the device 110 and/or the user 5 that can be used to determine if the present situation should be used to initiate generation of features needed to respond to the user input. For example, the trigger data may include the present time or present timestamp data, present location of the user, present event data (e.g., occurrence of an event, on-going event, etc.) and other data.

The system(s) 120 determines (138) that a duration of time is required to determine first data required to respond to the user input, where the duration of time is great enough to cause processing latencies and delay in respond to the user input. Such duration of time may be representative of the processing time to determine the first data needed to respond to the user input. For example, the first data needed to respond to a user input may be device name embeddings. In another example, the first data needed to respond to a user input may be state data representing a operational state of a device during a particular time (e.g., the porch lights are on at night, the bedroom lights are off at night, etc.).

The system(s) 120 processes (140), prior to the predicted time, second data to determine the first data. This processing is done to account for the processing latency/duration of time required to determine the first data. The system(s) 120 may determine which features/data are needed to respond to the predicted user input based on which features were used to respond to the user input in the past. Generation of these features may require considerable amount of time causing a delay in responding to the user input. The feature data may be generated using data received or stored relating to the user 5, device 110, or multiple devices within the user's home. The feature data may feature vector data, word or feature embeddings, encoded feature data, or any other representation of the features/data.

The systems(s) 120 stores (142) the first data in data storage so that it is available to use when the system(s) 120 receives the user input. Depending on the type of feature, the system(s) 120 may store the feature data in a particular database.

The system(s) 120 receives (144) a user input from the user 5 via the device 110. The system(s) 120 may receive the user input after the feature data has been generated by the system(s) 120. The user input may be received at a predicted time or when the user exhibits a predicted interaction as determined by the prediction model. The user input may be audio data representing an utterance spoken by the user 5 and captured by the device 110. The system(s) 120 may perform ASR processing using the audio data to determine text data corresponding to the utterance. Details on how the system performs ASR processing are described below. The system(s) 120 may perform NLU processing on the text data to determine an intent corresponding to the user input. Details on how the system performs NLU processing are described below.

The system(s) 120 determines (146), using the stored first data, output data responsive to the user input. The system(s) 120 may determine that the stored feature data is needed to generate the output data, and may retrieve the feature data from the data storage. In some embodiments, the system(s) 120 may pre-cache the feature data in anticipation of receiving the user input (that is, retrieve the feature data from data storage prior to right before the user input is expected by the system). Sometimes retrieving the feature data from data storage can also consume time, therefore, the system(s) 120 may pre-cache certain feature data. The system(s) 120 may send the feature data to other components within the system(s) 120 (for example, the orchestrator 230, the ASR component 250, the NLU component 260, etc.) for further processing to determine the output data. The system(s) 120 may use data determined by other components in addition to the stored feature data to determine the output data. The system(s) 120 may send the output data to the device 110 to respond to the user input or may perform an action responsive to the user input.

In some embodiments, the system(s) 120 may determine that a duration of time is required to retrieve/fetch the first data from the data storage, and pre-fetches/pre-caches the first data prior to the predicted time of when the user input is expected. For example, the data storage may store a large number of device name embeddings or a large amount of data corresponding to other features, and the system(s) 120 may need time to determine and retrieve the appropriate device name embedding or feature data required to respond to a particular user input. Based on the time needed to determine and retrieve the data from the data storage, the system(s) 120 may fetch and pre-cache the data from the data storage ahead of receiving the user input, so it is available for processing, thus reducing delays in responding to the user input.

Figure 2B:
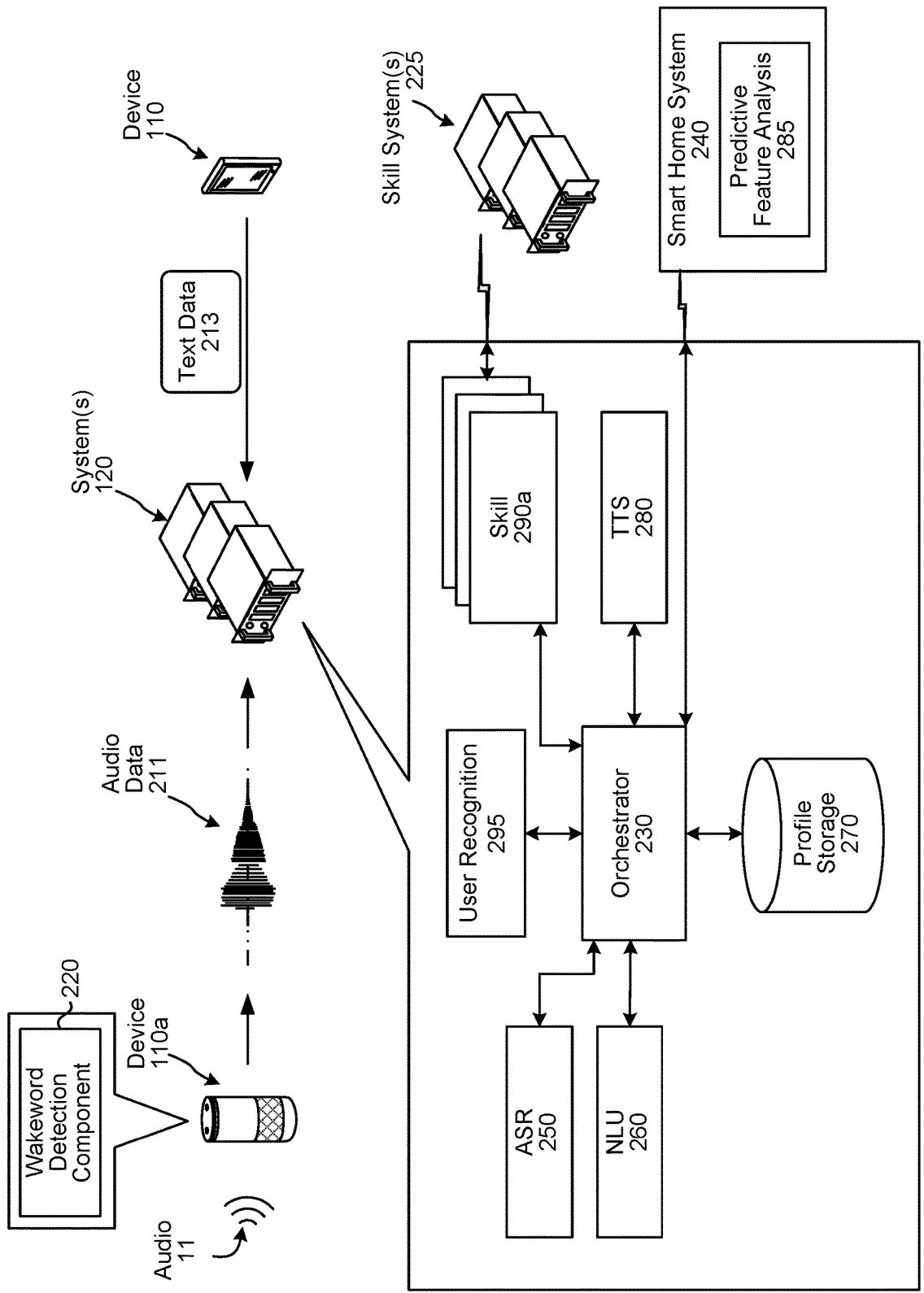

The overall system of the present disclosure may operate using various components as illustrated in FIGS. 2A and 2B. The various components may be located on same or different physical devices. Communication between various components may occur directly or across a network(s) 199.

An audio capture component(s), such as a microphone or array of microphones of the device 110a, captures audio 11. The device 110a processes audio data, representing the audio 11, to determine whether speech is detected. The device 110a may use various techniques to determine whether audio data includes speech. In some examples, the device 110a may apply voice activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110a may implement a limited classifier configured to distinguish speech from background noise. The classifier may be implemented by techniques such as linear classifiers, support vector machines, and decision trees. In still other examples, the device 110a may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data representing the audio 11, the device 110a may use a wakeword detection component 220 to perform wakeword detection to determine when a user intends to speak an input to the device 110. An example wakeword is "Alexa."

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data to determine if the audio data "matches" stored audio data corresponding to a wakeword.

Thus, the wakeword detection component 220 may compare audio data to stored models or data to detect a wakeword. One approach for wakeword detection applies general large vocabulary continuous speech recognition (LVCSR) systems to decode audio signals, with wakeword searching being conducted in the resulting lattices or confusion networks. LVCSR decoding may require relatively high computational resources. Another approach for wakeword detection builds HM:Ms for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 220 may be built on deep neural network (DNN)/recursive neural network (RNN) structures directly, without HMM being involved. Such an architecture may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

Once the wakeword is detected, the device 110a may "wake" and begin transmitting audio data 211, representing the audio 11, to the system(s) 120. The audio data 211 may include data corresponding to the wakeword, or the device 110a may remove the portion of the audio corresponding to the wakeword prior to sending the audio data 211 to the system(s) 120.

An orchestrator component 230 may receive the audio data 211. The orchestrator component 230 may include memory and logic that enables the orchestrator component 230 to transmit various pieces and forms of data to various components of the system, as well as perform other operations.

The orchestrator component 230 sends the audio data 211 to an ASR component 250. The ASR component 250 transcribes the audio data 211 into text data. The text data output by the ASR component 250 represents one or more than one (e.g., in the form of an n-best list) ASR hypotheses representing speech represented in the audio data 211. The ASR component 250 interprets the speech in the audio data 211 based on a similarity between the audio data 211 and pre-established language models. For example, the ASR component 250 may compare the audio data 211 with models for sounds (e.g., subword units, such as phonemes, etc.) and sequences of sounds to identify words that match the sequence of sounds of the speech represented in the audio data 211. The ASR component 250 outputs text data representing one or more ASR hypotheses. The text data output by the ASR component 250 may include a top scoring ASR hypothesis or may include an n-best list of ASR hypotheses. Each ASR hypothesis may be associated with a respective score. Each score may indicate a confidence of ASR processing performed to generate the ASR hypothesis with which the score is associated.

The orchestrator component 230 may send text data (e.g., text data output by the ASR component 250) to an NLU component 260.

The device 110 may send text data 213 to the server(s) 120. Upon receipt by the server(s) 120, the text data 213 may be sent to the orchestrator component 230, which may send the text data 213 to the NLU component 260.

The NLU component 260 attempts to make a semantic interpretation of the phrase(s) or statement(s) represented in the received text data. That is, the NLU component 260 determines one or more meanings associated with the phrase(s) or statement(s) represented in the text data based on words represented in the text data. The NLU component 260 determines an intent representing an action that a user desires be performed as well as pieces of the text data that allow a device (e.g., the device 110, the system(s) 120, a skill 290, a skill system(s) 125, etc.) to execute the intent. For example, if the text data corresponds to "play Adele music," the NLU component 260 may determine an intent that the system(s) 120 output music and may identify "Adele" as an artist. For further example, if the text data corresponds to "what is the weather," the NLU component 260 may determine an intent that the system(s) 120 output weather information associated with a geographic location of the device 110. In another example, if the text data corresponds to "turn off the lights," the NLU component 260 may determine an intent that the system(s) 120 turn off lights associated with the device(s) 110 or the user(s) 5. The NLU component 260 may send NLU results data (which may include tagged text data, indicators of intent, etc.).

The system(s) 120 may include one or more skills 290. A "skill" may be software running on the system(s) 120 that is akin to a software application running on a traditional computing device. That is, a skill 290 may enable the system(s) 120 to execute specific functionality in order to provide data or produce some other requested output. The system(s) 120 may be configured with more than one skill 290. For example, a weather service skill may enable the system(s) 120 to provide weather information, a car service skill may enable the system(s) 120 to book a trip with respect to a taxi or ride sharing service, a restaurant skill may enable the system(s) 120 to order a pizza with respect to the restaurant's online ordering system, etc. A skill 290 may operate in conjunction between the system(s) 120 and other devices, such as the device 110, in order to complete certain functions. Inputs to a skill 290 may come from speech processing interactions or through other interactions or input sources. A skill 290 may include hardware, software, firmware, or the like that may be dedicated to a particular skill 290 or shared among different skills 290.

In addition or alternatively to being implemented by the system(s) 120, a skill 290 may be implemented by a skill system(s) 125. Such may enable a skill system(s) 125 to execute specific functionality in order to provide data or perform some other action requested by a user.

Skills may be associated with different domains, such as smart home, music, video, flash briefing, shopping, and custom (e.g., skills not associated with any pre-configured domain).

The system(s) 120 may be configured with a single skill 290 dedicated to interacting with more than one skill system 125.

Unless expressly stated otherwise, reference to a skill, skill device, skill component, or the like herein may include a skill 290 operated by the system(s) 120 and/or skill operated by the skill system(s) 125. Moreover, the functionality described herein as a skill may be referred to using many different terms, such as an action, bot, app, or the like.

The system(s) 120 may include a post-NLU ranker that receives NLU results data and determines (as described in detail herein) which skill the system(s) 120 should invoke to execute with respect to the user input. The post-NLU ranker may be implemented separately from the orchestrator component 230 (as illustrated) or one or more components of the post-NLU ranker may be implemented as part of the orchestrator component 230.

The system(s) 120 may include a TTS component 280. The TTS component 280 may generate audio data (e.g., synthesized speech) from text data using one or more different methods. Text data input to the TTS component 280 may come from a skill 290, the orchestrator component 230, or another component of the system(s) 120.

In one method of synthesis called unit selection, the TTS component 280 matches text data against a database of recorded speech. The TTS component 280 selects matching units of recorded speech and concatenates the units together to form audio data. In another method of synthesis called parametric synthesis, the TTS component 280 varies parameters such as frequency, volume, and noise to create audio data including an artificial speech waveform. Parametric synthesis uses a computerized voice generator, sometimes called a vocoder.

The system(s) 120 may include profile storage 270. The profile storage 270 may include a variety of information related to individual users, groups of users, devices, etc. that interact with the system(s) 120. A "profile" refers to a set of data associated with a user, group of users, device, etc. The data of a profile may include preferences specific to the user, group of users, device, etc.; input and output capabilities of one or more devices; internet connectivity information; user bibliographic information; subscription information; as well as other information.

The profile storage 270 may include one or more user profiles, with each user profile being associated with a different user identifier. Each user profile may include various user identifying information. Each user profile may also include preferences of the user and/or one or more device identifiers, representing one or more devices registered to the user. Each user profile may include identifiers of skills that the user has enabled. When a user enables a skill, the user is providing the system(s) 120 with permission to allow the skill to execute with respect to the user's inputs. If a user does not enable a skill, the system(s) 120 may not permit the skill to execute with respect to the user's inputs.

The profile storage 270 may include one or more group profiles. Each group profile may be associated with a different group profile identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile. A group profile may include one or more device profiles representing one or more devices associated with the group profile.

The profile storage 270 may include one or more device profiles. Each device profile may be associated with a different device identifier. Each device profile may include various device identifying information. Each device profile may also include one or more user identifiers, representing one or more user profiles associated with the device profile. For example, a household device's profile may include the user identifiers of users of the household.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

Various machine learning techniques may be used to train and operate models to perform various steps described herein, such as user recognition feature extraction, encoding, user recognition scoring, user recognition confidence determination, etc. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

The system(s) 120 may also include a predictive feature analysis component 285. The predictive feature analysis component 285 may be configured to predict when the system may receive a user input associated with a particular intent that requires computationally intensive feature generation and trigger feature generation in advance of receiving the user input.

As shown in FIG. 2A, the predictive feature analysis component 285 may be part of the system(s) 120, which may be a speech processing system as described above. FIG. 2B illustrates another example configuration of the components of the system. As shown in FIG. 2B, the predictive feature analysis component 285 may be part of a smart home system 240, and configured to predict user interaction patterns with respect to various smart devices supported by the smart home system 240. The smart home system 240 may be configured to handle user interactions with smart devices including various home appliances, such as light switches, washer/dryer machines, toaster ovens, microwaves, thermostats, home security systems, doorbells, televisions, speakers, and the like. The audio 11 may represent a user request with respect to operating one or more devices within the user's home, and may correspond to a "turn on," "turn off" intent" or other intents relating to operating such devices.

Figure 3:
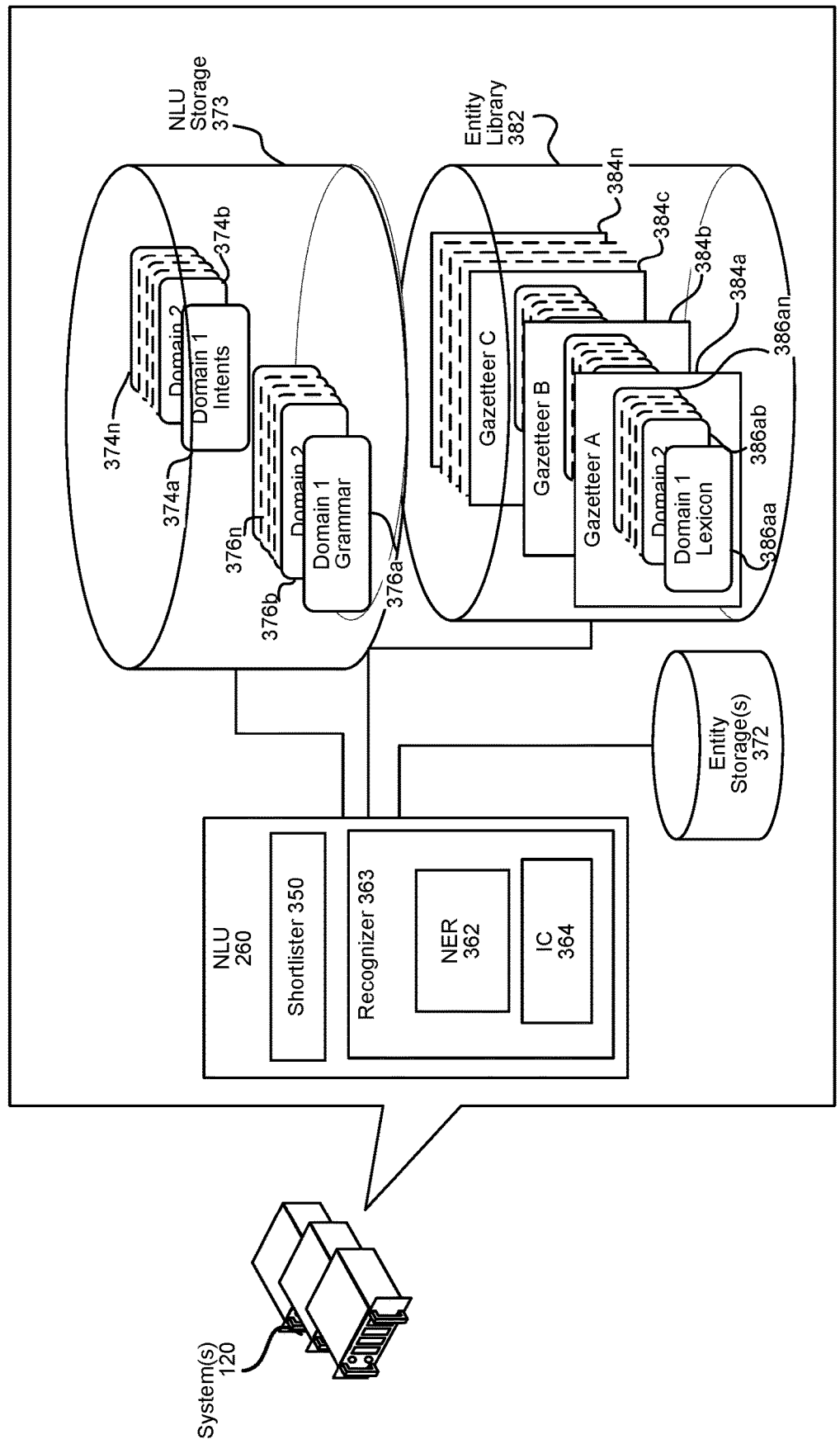
FIG. 3 is a conceptual diagram illustrating how NLU processing may be performed according to embodiments of the present disclosure.

FIG. 3 illustrates how NLU processing is performed on text data. The NLU component 260 may process text data including several ASR hypotheses of a single user input. For example, if the ASR component 250 outputs text data including an n-best list of ASR hypotheses, the NLU component 260 may process the text data with respect to all (or a portion of) the ASR hypotheses represented therein.

The NLU component 260 may annotate text data by parsing and/or tagging the text data. For example, for the text data "tell me the weather for Seattle," the NLU component 260 may tag "tell me the weather for Seattle" as an <OutputWeather> intent as well as separately tag "Seattle" as a location for the weather information.

The NLU component 260 may include a shortlister component 350. The shortlister component 350 selects skills that may execute with respect to text data input to the NLU component 260 (e.g., applications that may execute with respect to the user input). The shortlister component 350 thus limits downstream, more resource intensive NLU processes to being performed with respect to skills that may execute with respect to the user input.

Without a shortlister component 350, the NLU component 260 may process text data input thereto with respect to every skill of the system, either in parallel, in series, or using some combination thereof. By implementing a shortlister component 350, the NLU component 260 may process text data with respect to only the skills that may execute with respect to the user input. This reduces total compute power and latency attributed to NLU processing.

The shortlister component 350 may include one or more trained models. The model(s) may be trained to recognize various forms of user inputs that may be received by the system(s) 120. For example, during a training period skill system(s) 125 associated with a skill may provide the system(s) 120 with training text data representing sample user inputs that may be provided by a user to invoke the skill. For example, for a ride sharing skill, a skill system(s) 125 associated with the ride sharing skill may provide the system(s) 120 with training text data including text corresponding to "get me a cab to [location]," "get me a ride to [location]," "book me a cab to [location]," "book me a ride to [location]," etc. The one or more trained models that will be used by the shortlister component 350 may be trained, using the training text data representing sample user inputs, to determine other potentially related user input structures that users may try to use to invoke the particular skill. During training, the system(s) 120 may solicit the skill system(s) 125 associated with the skill regarding whether the determined other user input structures are permissible, from the perspective of the skill system(s) 125, to be used to invoke the skill. The alternate user input structures may be derived by one or more trained models during model training and/or may be based on user input structures provided by different skills. The skill system(s) 125 associated with a particular skill may also provide the system(s) 120 with training text data indicating grammar and annotations. The system(s) 120 may use the training text data representing the sample user inputs, the determined related user input(s), the grammar, and the annotations to train a model(s) that indicates when a user input is likely to be directed to/handled by a skill, based at least in part on the structure of the user input. Each trained model of the shortlister component 350 may be trained with respect to a different skill. Alternatively, the shortlister component 350 may use one trained model per domain, such as one trained model for skills associated with a weather domain, one trained model for skills associated with a ride sharing domain, etc.

The system(s) 120 may use the sample user inputs provided by a skill system(s) 125, and related sample user inputs potentially determined during training, as binary examples to train a model associated with a skill associated with the skill system(s) 125. The model associated with the particular skill may then be operated at runtime by the shortlister component 350. For example, some sample user inputs may be positive examples (e.g., user inputs that may be used to invoke the skill). Other sample user inputs may be negative examples (e.g., user inputs that may not be used to invoke the skill).

As described above, the shortlister component 350 may include a different trained model for each skill of the system, a different trained model for each domain, or some other combination of trained model(s). For example, the shortlister component 350 may alternatively include a single model. The single model may include a portion trained with respect to characteristics (e.g., semantic characteristics) shared by all skills of the system. The single model may also include skill-specific portions, with each skill-specific portion being trained with respect to a specific skill of the system. Implementing a single model with skill-specific portions may result in less latency than implementing a different trained model for each skill because the single model with skill-specific portions limits the number of characteristics processed on a per skill level.

The portion trained with respect to characteristics shared by more than one skill may be clustered based on domain. For example, a first portion of the portion trained with respect to multiple skills may be trained with respect to weather domain skills, a second portion of the portion trained with respect to multiple skills may be trained with respect to music domain skills, a third portion of the portion trained with respect to multiple skills may be trained with respect to travel domain skills, etc.

Clustering may not be beneficial in every instance because it may cause the shortlister component 350 to output indications of only a portion of the skills that the text data may relate to. For example, a user input may correspond to "tell me about Tom Collins." If the model is clustered based on domain, the shortlister component 350 may determine the user input corresponds to a recipe skill (e.g., a drink recipe) even though the user input may also correspond to an information skill (e.g., including information about a person named Tom Collins).

Training the shortlister component 350 may require establishing a "ground truth" for the training examples input therein. The shortlister component 350 may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

The NLU component 260 may include one or more recognizers 363. Each recognizer 363 may be associated with a different domain (e.g., smart home, video, music, weather, custom, etc.).

If the shortlister component 350 determines text data is potentially associated with multiple domains, the recognizers 363 associated with the domains may process the text data, while recognizers 363 not indicated in the shortlister component 350's output may not process the text data. The "shortlisted" recognizers 363 may process the text data in parallel, in series, partially in parallel, etc. For example, if text data potentially relates to both a communications domain and a music domain, a recognizer associated with the communications domain may process the text data in parallel, or partially in parallel, with a recognizer associated with the music domain processing the text data.

Each recognizer 363 may include a named entity recognition (NER) component 362. The NER component 362 attempts to identify grammars and lexical information that may be used to construe meaning with respect to text data input therein. The NER component 362 identifies portions of text data that correspond to a named entity associated with a domain, associated with the recognizer 363 implementing the NER component 362. The NER component 362 (or other component of the NLU component 260) may also determine whether a word refers to an entity whose identity is not explicitly mentioned in the text data, for example "him," "her," "it" or other anaphora, exophora, or the like.

Each recognizer 363, and more specifically each NER component 362, may be associated with a particular grammar database 376, a particular set of intents/actions 374, and a particular personalized lexicon 386. Each gazetteer 384 may include domain-indexed lexical information associated with a particular user and/or device 110. For example, a Gazetteer A (384a) includes domain-indexed lexical information 386aa to 386an. A user's music domain lexical information might include album titles, artist names, and song names, for example, whereas a user's communications domain lexical information might include the names of contacts. Since every user's music collection and contact list is presumably different. This personalized information improves later performed entity resolution.

An NER component 362 applies grammar information 376 and lexical information 386 associated with a domain (associated with the recognizer 363 implementing the NER component 362) to determine a mention of one or more entities in text data. In this manner, the NER component 362 identifies "slots" (each corresponding to one or more particular words in text data) that may be useful for later processing. The NER component 362 may also label each slot with a type (e.g., noun, place, city, artist name, song name, etc.).

Each grammar database 376 includes the names of entities (i.e., nouns) commonly found in speech about the particular domain to which the grammar database 376 relates, whereas the lexical information 386 is personalized to the user and/or the device 110 from which the user input originated. For example, a grammar database 376 associated with a shopping domain may include a database of words commonly used when people discuss shopping.

A downstream process called entity resolution (discussed in detail elsewhere herein) links a slot of text data to a specific entity known to the system. To perform entity resolution, the NLU component 260 may utilize gazetteer information (384a-384n) stored in an entity library storage 382. The gazetteer information 384 may be used to match text data (representing a portion of the user input) with text data representing known entities, such as song titles, contact names, etc. Gazetteers 384 may be linked to users (e.g., a particular gazetteer may be associated with a specific user's music collection), may be linked to certain domains (e.g., a shopping domain, a music domain, a video domain, etc.), or may be organized in a variety of other ways.

Each recognizer 363 may also include an intent classification (IC) component 364. An IC component 364 parses text data to determine an intent(s) (associated with the domain associated with the recognizer 363 implementing the IC component 364) that potentially represents the user input. An intent represents to an action a user desires be performed. An IC component 364 may communicate with a database 374 of words linked to intents. For example, a music intent database may link words and phrases such as "quiet," "volume off," and "mute" to a <Mute> intent. An IC component 364 identifies potential intents by comparing words and phrases in text data (representing at least a portion of the user input) to the words and phrases in an intents database 374 (associated with the domain that is associated with the recognizer 363 implementing the IC component 364).

The intents identifiable by a specific IC component 364 are linked to domain-specific (i.e., the domain associated with the recognizer 363 implementing the IC component 364) grammar frameworks 376 with "slots" to be filled. Each slot of a grammar framework 376 corresponds to a portion of text data that the system believes corresponds to an entity. For example, a grammar framework 376 corresponding to a <PlayMusic> intent may correspond to text data sentence structures such as "Play {Artist Name}," "Play {Album Name}," "Play {Song name}," "Play {Song name} by {Artist Name}," etc. However, to make entity resolution more flexible, grammar frameworks 376 may not be structured as sentences, but rather based on associating slots with grammatical tags.

For example, an NER component 362 may parse text data to identify words as subject, object, verb, preposition, etc. based on grammar rules and/or models prior to recognizing named entities in the text data. An IC component 364 (implemented by the same recognizer 363 as the NER component 362) may use the identified verb to identify an intent. The NER component 362 may then determine a grammar model 276 associated with the identified intent. For example, a grammar model 376 for an intent corresponding to <PlayMusic> may specify a list of slots applicable to play the identified "object" and any object modifier (e.g., a prepositional phrase), such as {Artist Name}, {Album Name}, {Song name}, etc. The NER component 362 may then search corresponding fields in a lexicon 386 (associated with the domain associated with the recognizer 363 implementing the NER component 362), attempting to match words and phrases in text data the NER component 362 previously tagged as a grammatical object or object modifier with those identified in the lexicon 386.

An NER component 362 may perform semantic tagging, which is the labeling of a word or combination of words according to their type/semantic meaning. An NER component 362 may parse text data using heuristic grammar rules, or a model may be constructed using techniques such as Hidden Markov Models, maximum entropy models, log linear models, conditional random fields (CRF), and the like. For example, an NER component 362 implemented by a music domain recognizer may parse and tag text data corresponding to "play mother's little helper by the rolling stones" as {Verb}: "Play," {Object}: "mother's little helper," {Object Preposition}: "by," and {Object Modifier}: "the rolling stones." The NER component 362 identifies "Play" as a verb based on a word database associated with the music domain, which an IC component 364 (also implemented by the music domain recognizer) may determine corresponds to a <PlayMusic> intent. At this stage, no determination has been made as to the meaning of "mother's little helper" or "the rolling stones," but based on grammar rules and models, the NER component 362 has determined the text of these phrases relates to the grammatical object (i.e., entity) of the user input represented in the text data.

An NER component 362 may tag text data to attribute meaning thereto. For example, an NER component 362 may tag "play mother's little helper by the rolling stones" as: {domain} Music, {intent}<PlayMusic>, {artist name} rolling stones, {media type} SONG, and {song title} mother's little helper. For further example, the NER component 362 may tag "play songs by the rolling stones" as: {domain} Music, {intent}<PlayMusic>, {artist name} rolling stones, and {media type} SONG.

Figure 4:
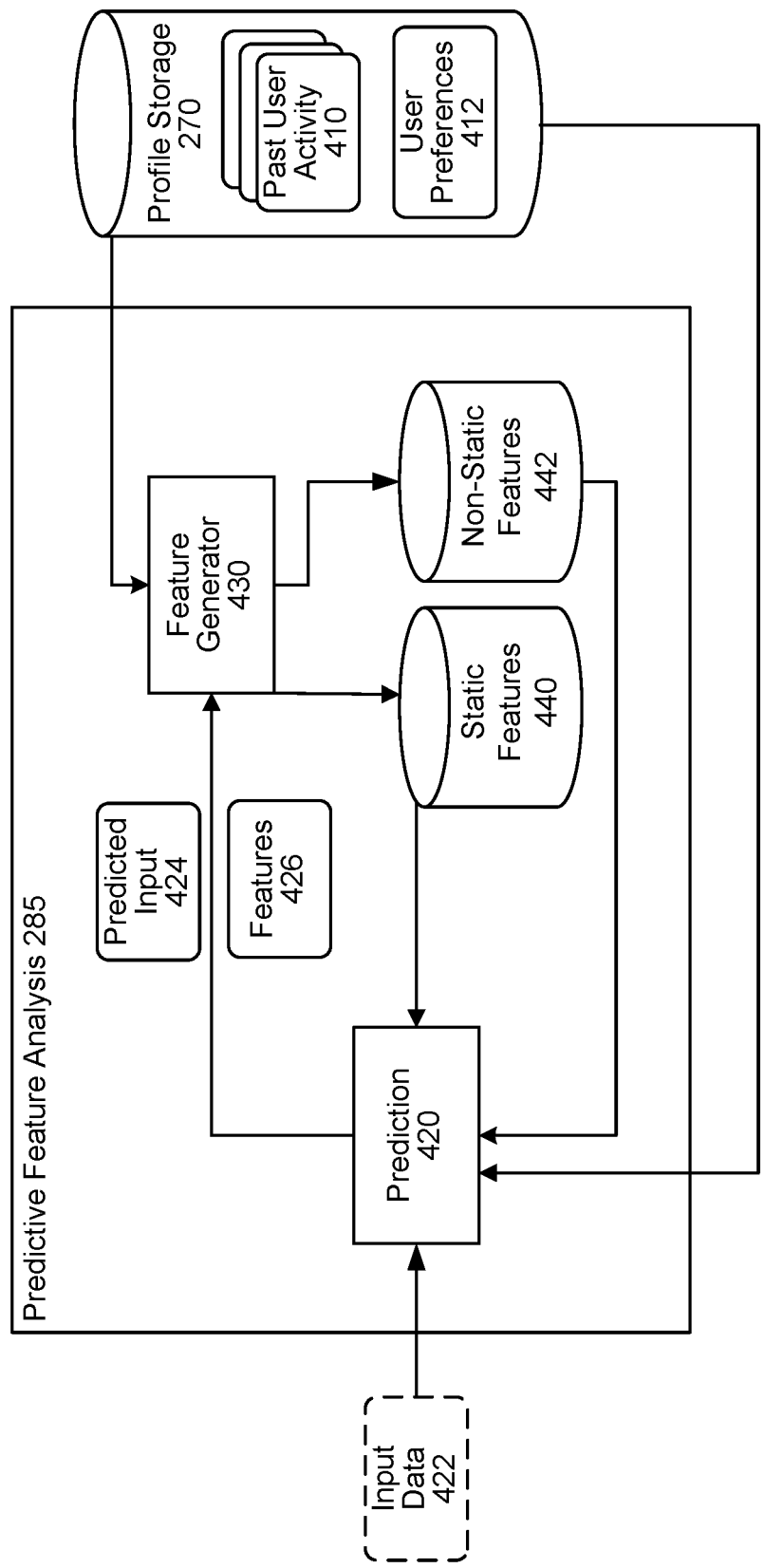
FIG. 4 is a conceptual diagram illustrating components of the predictive feature analysis component that the system can use according to embodiments of the present disclosure.

FIG. 4 is a conceptual diagram illustrating components of the predictive feature analysis component 285 that the system can use according to embodiments of the present disclosure. The predictive feature analysis component 285 is configured to predict when the system may receive a user request requiring computational intensive analysis and trigger feature generation in advance of receiving the user request. The predictive feature analysis component 285 may include a prediction component 420, a feature generator 430, a static features data storage 440 and a non-static features data storage 442.

For computationally expensive features (such as device names or time-based features) the predictive feature analysis component 285 is configured to predict a user input from a user, determine the features needed to respond to the user input, and trigger pre-computation and pre-caching of the features, so that when the user input is received the system can retrieve the features from the data storage.

In a non-limiting example, the predictive feature analysis component 285 may be used to generate time-based features that need to be generated for a given time window prior to receiving the user input. In another non-limiting example, the predictive feature analysis component 285 may be used to generate device name embeddings based on the predicted user input being related to operation of a particular device.

In some embodiments, the feature generator 430 retrieves data from the profile storage 270, processes the data to determine feature data and stores the data in the static features data storage 440 or the non-static features data storage 442. The prediction component 420 retrieves processed data from the data storages 440 and 442 to determine user interaction patterns and build the prediction model to determine when a particular user input is expected at the system. After the prediction component 420 determines the predicted input 424, the feature generator 430 precomputes and stores feature data to respond to the predicted input 424, and may update the data storage 440 and 442 if needed. After a user input representing the predicted user input 424 is received by the system, the prediction component 420 may update the prediction model using the data stored at data storage 440 and 442.

In some embodiments, the prediction component 420 may be configured to process past user activity and past user inputs to determine a prediction model to predict when the system(s) 120 may receive a user request that is computationally intensive (e.g., uses a significant amount of computation resources, associated with computational latencies, etc.). The prediction component 420 may receive data from the profile storage 270, such as past user activity data 410 and user preferences data 412. The past user activity data 410 may include data relating to past user requests and inputs, where responding to the past user inputs required determining certain feature data that was computationally intensive. For example, the past user requests of "turn on hallway lights" or "I am home, turn on the lights" requires the system(s) 120 to compute feature data (e.g., embeddings) related to the device name mentioned in the user request to determine which device the user wants to turn on. Determining the device name embeddings is computationally intensive, and the predictive feature analysis component 285 may precompute such device name embeddings and store them in a database.

The past user activity data 410 may include timestamp data indicating when each of the past user requests were received. For example, the past user activity data 410 may include the text data representing a first past user request and a first timestamp when it was received (e.g., Monday, Jan. 1, 2019, 8:45 am EST). In some embodiments, the timestamp data may be more general and may indicate the day of the week and general time of the day the past user request was received, for example, Monday morning. In some embodiments, the prediction component 420 may determine 'time bins' using the timestamp data to generalize when the past user request was received. For example, using the first timestamp Monday, Jan. 1, 2019, 8:45 am EST, the prediction component 420 may associate a first time bin of "Monday morning" with the first past user input. Similarly, the past user activity data 420 may include text data representing a second past user request and a second timestamp indicating when the second past user request was received by the system(s) 120.

The past user activity data 410 may also include location data indicating where the user was located when providing the user request. The location data may be determined based on the location of the device 110 that captures the user request. The location data may also be determined using other location determination techniques, such as GPS data associated with other device(s) being carried or approximate to the user. The location data may be GPS coordinates, an address, a user-identified name for the location (e.g., a user may assign the name "work" to a particular address and "home" to another address), etc. For example, the past user activity data 410 may include first location data associated with the first past user request, where the first location data indicates the user entered the home when requesting to turn on the hallway lights.

The past user activity data 410 may also include event data indicating occurrence of one or more events when the user provided the user request or in response to which the provided the user request. The event data may be related to events that occurred within a predefined time period of the past user request, for example, within minutes of the past user request. The event data may also be related to an on-going event, such as, a holiday, a sporting event, etc. For example, first event data associated with the first past user request may indicate that the user request was received in response to the user entering a geofence. Such event data may be determined using sensor data associated with the user's device(s) proximate to the user. As another example, second event data associated with the second past user request may indicate that the user request was received when a device in the user's home was in particular operative state (e.g., a smart oven was on, lights are off, garage door was open, etc.). An operative state of a device may refer to states or conditions of devices, such as the device being on, the device being off, the device being open, the device being closed, the device being set at a particular temperature, channel, timer, clock, or other setting, and the like.

The past user activity data 410 may also include other data can be used by the prediction component 420 to predict when the system can expect the particular type of user request. For example, the past user activity data 410 may also include user device information, user type information, user profile information, device type, etc. The system may determine which past user activity data 410 to use to determine the prediction model based on the intent (as determined by the NLU component 260) corresponding to the past user requests.

The prediction component 420 may also process user preferences data 412 to determine the prediction model to predict when the system(s) 120 may receive a particular user request. The user preferences data 412 may include user-selected/provided data indicating when the user prefers to receive particular information. For example, the user may have indicated that he prefers the hallway lights are on when he enters the home or that the bathroom lights are on when his alarm goes off in the morning.

The prediction component 420 may determine multiple prediction models, each corresponding to a particular user request type. For example, the prediction component 420 may determine a first prediction model to predict when the system may receive a user request relating to operation of a device within the user's home, a second prediction model to predict when the system may receive a user request to play media (such as, songs, movies, books, etc.), a third prediction model to determine when the system may receive a user request to hear a new briefing or flash briefing, and so on. The prediction component 420 may process the past user activity data 410 and user preferences data 412 that relate to the particular user request type to determine the corresponding prediction model.

The prediction component 420 may employ one or more machine learning models to process the past user activity data 410 and the user preferences data 412 to determine the prediction model to predict when the system(s) 120 may receive a particular user request. The machine learning model(s) may include neural network models, deep learning models, probabilistic models, statistical models, regression models, and other types of inference models. The machine learning model(s) may be trained using training data, where the training data may be associated with multiple users and may include past user requests from multiple users and corresponding user activity data (e.g., timestamp data, location data, event data, etc.). During runtime, the machine learning model(s) may be configured to process data associated with the user 5 and predict when a user request from user 5 can be expected by the system(s) 120.

Various machine learning techniques may be used to train and operate models employed by the prediction component 420. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the trained models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

In some embodiments, the prediction component 420 may employ a separate machine learning model for each type of data that is processed. For example, the prediction component 420 may use a first machine learning model to process the timestamp data to predict a likelihood of when the system may receive the user request based on the current time. The prediction component 420 may use a second machine learning model to process the location data to predict a likelihood of when the system may receive the user request based on the user's location. The prediction component 420 may use a third machine learning model to process the event data to predict a likelihood of when the system may receive the user request based on occurrence of an event.

The prediction component 420 may determine a score indicating a likelihood of receiving a particular user request corresponding to a particular intent. The score may indicate how likely it is that the system receives the particular user request at a predicted time. The prediction component 420 may indicate a likelihood of receiving the user request based on receiving input data 422. The input data 422 may represent a condition or situation that has occurred or is about to occur, such as time, location, event data, etc. For example, the prediction component 420 may determine with a high confidence level that the system will receive a predicted user input (e.g., "turn on hallway lights") when the user enters the home. In other embodiments, the prediction component 420 may indicate separate likelihoods for different factors. For example, the prediction component 420 may indicate that there is 30% chance that the system will receive the predicted user input at 5 pm on Monday, a 70% that the system will receive the predicted user input when the user enters the home, a 40% chance that the system will receive the predicted user input when the user enters his vehicle, etc.

The prediction component 420 may determine pattern data using the data from the profile storage 270. The prediction component 420 may be configured to process the past user activity data 410 to determine a user pattern indicating when a user may provide a particular user input. The prediction component 420 may perform statistical analysis using the past user activity data 410 relating to the particular user input to determine a pattern with respect to time, that is, when users typically provide the user input. The prediction component 420 may also perform statistical analysis to determine a pattern with respect to location, that is, where are users typically located when providing the user input. The prediction component 420 may also perform statistical analysis to determine a pattern with respect to event occurrence, that is, which event or type of event occurred when users typically provide the user input. For example, the prediction component 420 may determine a pattern indicating that users typical want to turn on the hallway or entryway lights when they arrive home, between 5 $\mu$m and 6 pm.

The prediction component 420 outputs the predicted user input 424 and features 426 that may be required to process the predicted user input. This data is provided to the feature generator 430. The predicted user input 424 may be text data representing the user input that the system expects to receive in the future. The prediction component 420 may determine the features 426 by determining the intent and slot data associated with the predicted user input 424. The features 426 may be determined using data determined by the ASR component 250 and the NLU component 260 when previously processing the predicted user input. The features 426 may identify (e.g., by name, storage location of the data, etc.) the features required to process the predicted user input. In some embodiments, the features 426 may identify a feature component (e.g., 522 or 532) of the feature generator 430 to invoke/execute to precompute the features needed to respond to the predicted user input.

The components of the feature generator 430 are described below in relation to FIG. 5. The feature generator 430 may be configured to process the predicted user input 424 and the features 426 to precompute and precache feature data needed to respond to the predicted user input. The feature generator 430 may be configured to precompute static features and non-static features. Static features may refer to data that remains constant for a longer period of time than non-static features. Example of static features may include device names provided by the user, location names/addresses (e.g., for work, for home, etc.) provided by the user, and the like. The system updates the static features when a user provides an update (e.g., the user adds a device, the user removes a device, the user updates a device name, etc.) Non-static features may refer to data that is changing during small time windows/periods. Examples of non-static features may include devices' operative states, user activity during a period of time, and the like. The system updates the non-static features every given time window so that the most up to date user interaction pattern or home condition/state is known to the system.

The feature generator 430 stores the precomputed static features in the static feature data storage 440 and stores the precomputed non-static features in the non-static feature data storage 442. When the predicted user input is received by the system(s) 120, the orchestrator 230 may retrieve the necessary data from the data storages 440 and 442 to perform any additional processing needed to respond to the user input.

The prediction component 420 may be configured to determine if feature generation should be initiated. The input data 422 may include data representing the present context/ situation/conditions relating to the device 110 and/or the user 5 that can be used to determine if the present situation should be used to initiate feature generation. For example, the input data 422 may include the present time or present timestamp data (e.g., 8 am on Monday; Jan. 15, 2019, 8 am on Monday; etc.), present location of the user (e.g., GPS coordinates, address, user-provided location name, etc.), present event data (e.g., occurrence of an event, on-going event, etc.). The component 420 may process the input data 422 to determine whether the input data 422 indicates a trigger to initiate feature generation. For example, the prediction model may indicate that there is a 70% chance that the system will receive the user request to turn on the hallway lights at 5 pm on Monday and the input data 422 may indicate that it is 4:45 pm on Monday. The prediction component 420 may determine that the timestamp indicated by the input data 422 is within a threshold of the timestamp indicated by the prediction model, and the probability of receiving a user request to turn on the hallway lights is high (70% chance), so feature generation should be initiated.

In some embodiments, the input data 422 is received by the prediction component 420 because another component (e.g., orchestrator 230, device 110, etc.) sent the input data 422 to the prediction component 420 (e.g., in a push model). In other embodiments, the prediction component 420 may retrieve the input data 422 periodically to determine if a trigger to initiate feature generation occurred (e.g., in a pull model).

If the component 420 determines to trigger feature generation, then it may send a signal to the feature generator 430. If the component 420 determines to not trigger feature generation, then the prediction component 420 may continue to receive input data 422 and/or may continue to determine or update the prediction model using the profile data 270.

In some embodiments, the predictive feature analysis component 285 may determine processing latency data indicating the latency in computing certain features, and may use the processing latency data to determine when the features generation should be triggered. For example, the processing latency data may indicate that processing features related to device names requires approximately 1 minute. Based on this processing latency, the predictive feature analysis component 285 may determine to initiate precomputation of the device name features in advance (at least 1 minute in advance) of when the user input is predicted to be received by the system(s) 120.

In a non-limiting example, the predictive feature analysis component 285 may be used by the smart home system 240 to enable the system to respond a user request relating to operation of a device, and to enable the system to check with the user which device the user intends to interact with in the case where the system is unable to determine the device with a certain confidence. For example, the user input may be "Alexa, turn on the entryway lights," and the system may determine that the user profile does not include a device identified as "entryway lights." In that case, the system may generate device name embeddings using "entryway lights," where the embeddings include semantically similar device names and phonetically similar device names. Using the device name embeddings (and other user profile data) the system may determine that it is likely the user meant "hallway lights." In that case, the system may ask the user for clarification by responding with "Did you mean turn on the hallway lights?" To enable the system to ask the user for clarification with an alternative device name, the system has to compute the device name embeddings, which may cause a delay in responding to the user. In this case, the predictive feature analysis component 285 can precompute and store device name embeddings for all the devices associated with the user profile, and the system can use the stored device name embeddings to respond to the user.

In another non-limiting example, the predictive feature analysis component 285 may be used to determine when to retrieve (pre-cache) the device name embeddings to have the data ready for processing to respond to a user request. The number of device name embeddings increases as the number of devices associated with a user profile increase. The system may need time to determine which (precomputed and stored) device embeddings is needed to respond to a user request. To reduce the time in retrieving (fetching) the device name embeddings, the predictive feature analysis component 285 may predict when a user request relating to a particular device is expected by the system, and pre-cache the device name embeddings corresponding to the particular device so that the system can use the pre-cached data for further processing to respond to the user request.

In another non-limiting example, the predictive feature analysis component 285 may be used to inform the user of the state of the devices in the user's home, in particular when the device in a state other than the preferred state. For example, the user may prefer to have the porch lights on at night. By processing the user history data and user preference data, the prediction component 420 may determine that the porch lights are typically on at night (e.g., around 9 PM). To be able to inform the user of the state of multiple devices within the user's home, the system may need time to process the device state data, causing a delay in informing the user of the device states. Therefore, to be able to inform the user of the state of the porch lights prior to 9 PM, the predictive feature analysis component 285 may precompute and store data relating to the device state. Before or around 9 PM, the user may interact with the system with respect to another device "Alexa, turn on the TV." The system may determine, based on the precomputed device state, that the porch lights are off and they are typically on at this time. In that case, the system may respond to the user "The TV is on. By the way, the porch lights are off. Do you want me to turn them on?" Thus, the system may inform the user of the state of the porch lights being different than the preferred state at a particular time.

Figure 5:
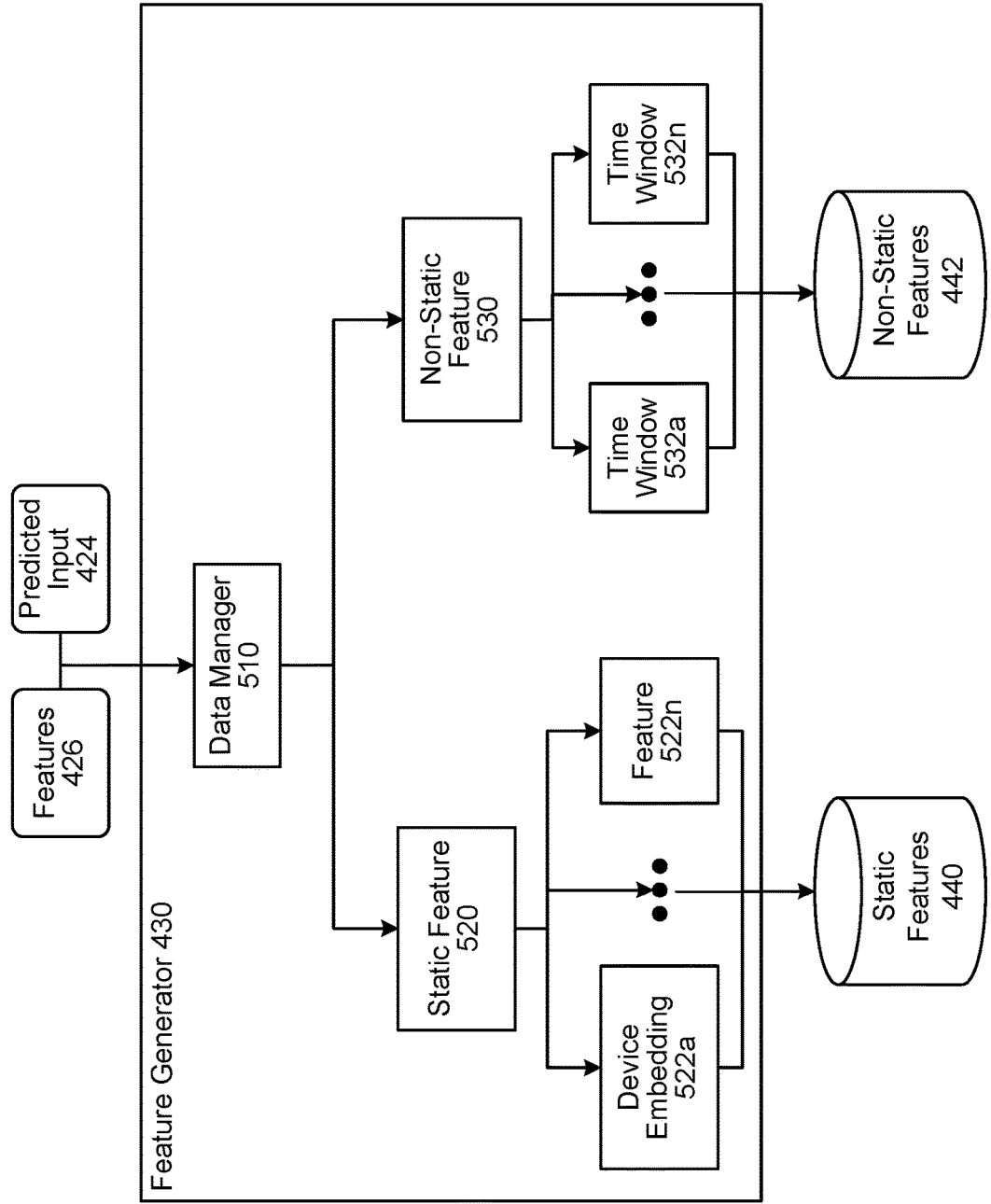
FIG. 5 is a conceptual diagram illustrating components of the feature generator according to embodiments of the present disclosure.

FIG. 5 is a conceptual diagram illustrating components of the feature generator 430 according to embodiments of the present disclosure. The feature generator 430 may include a data manager component 510, multiple static feature components 522*a*-522*n* and multiple non-static feature components 532*a*-532*n*. The data manager component 510 invoke the appropriate static or non-static feature component based on the features 426 For example, when the features 426 indicates that device name embeddings are required for the predicted user input, the data manager component 510 may invoke the device embedding component 522*a*. When the features 426 indicates that device state information is required for the predicted user input, the data manager component may invoke the time window component 532*a*. The static feature components 522 may determine when the data in the static feature data storage 440 should be updated, for example, when new or updated information is received from the user or the system. For example, the device embedding component 522a may determine to update the data in the static feature data storage 440 when the system receives new or updated device names from the user or the system is configured to work with a new device. The non-static feature components 532 may determine that the data in the non-static feature data storage 442 should be updated when the data has expired. That is, the data in the data storage 442 was computed for a given past time window, and updated information is needed to respond to user inputs. For example, device state information associated with devices in the user's home may be computed and stored every hour so that the non-static data storage 442 includes up-to-date information for a user's home and also includes past information for a user's home.

The static feature data storage 440 may be configured to identify user specific feature data and widely used/non-user specific feature data. For example, when storing device name embeddings, the static feature data storage 440 may identify a device name embedding corresponding to a device name provided by the user (e.g., hallway lights, John's room lights, porch lights, etc.) as user-specific features, and may identify a device name embedding corresponding to a device name widely used by the system (across multiple users) (e.g., bedroom lights, oven, etc.) as non-user-specific features.

In some embodiments, the system described herein may be used to help a user setup a new device 110. To setup a voice-activated device, such as device 110, may require numerous steps and interactions with the device. The user may be involved in a multi-turn conversation with the device 110 while the system presents the user with step-by-step setup instructions, including instructions to integrate other devices such as smart home appliances. To perform such a setup action, the system may need to perform computations and determine data like device embeddings and device configurations that require processing time. The predictive feature analysis component 285 may be used to precompute, store and pre-cache data required for such setup interactions between the system and the user to reduce delay in setup.

Figure 6:
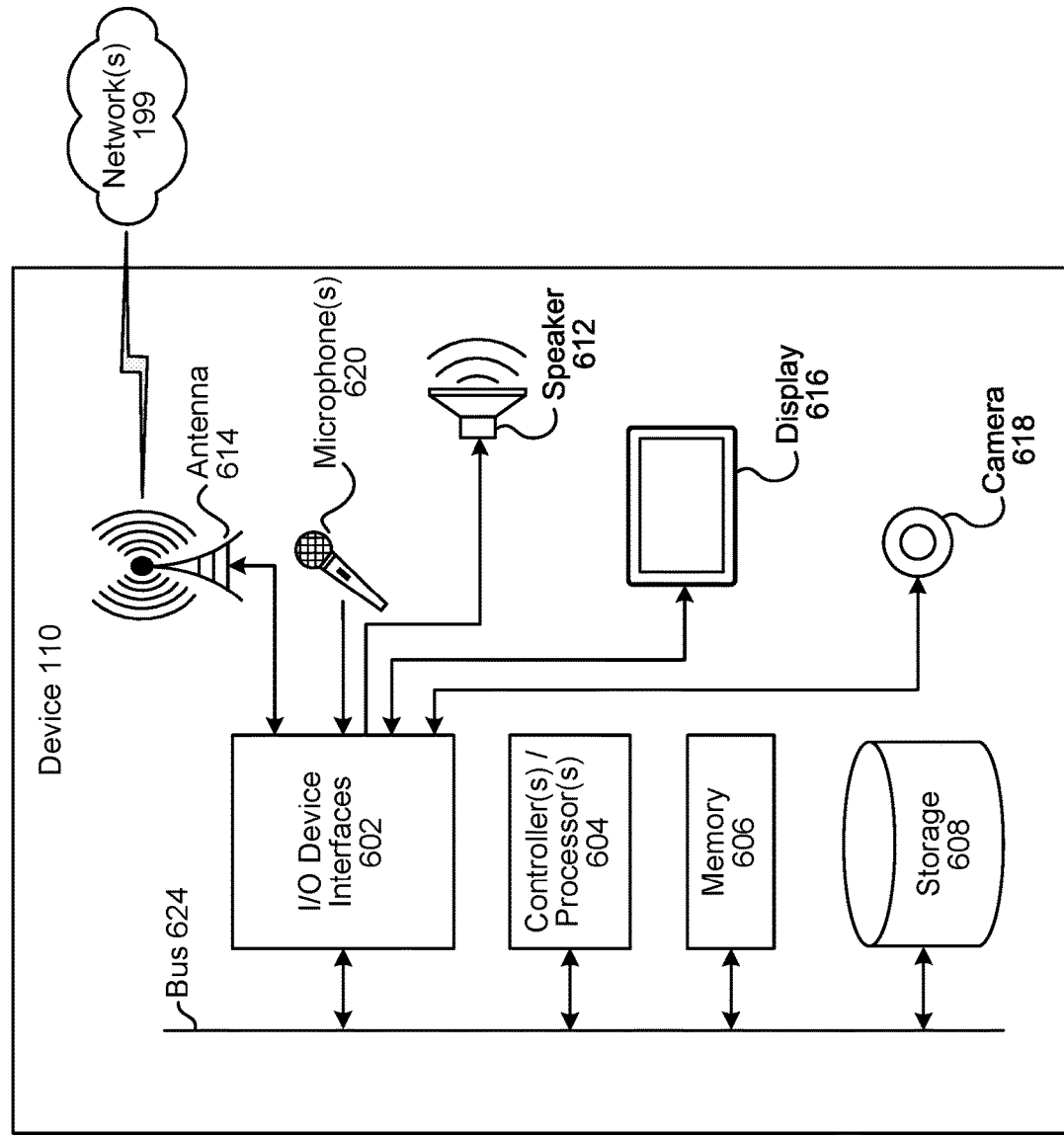
FIG. 6 is a block diagram conceptually illustrating example components of a device according to embodiments of the present disclosure.
Figure 7:
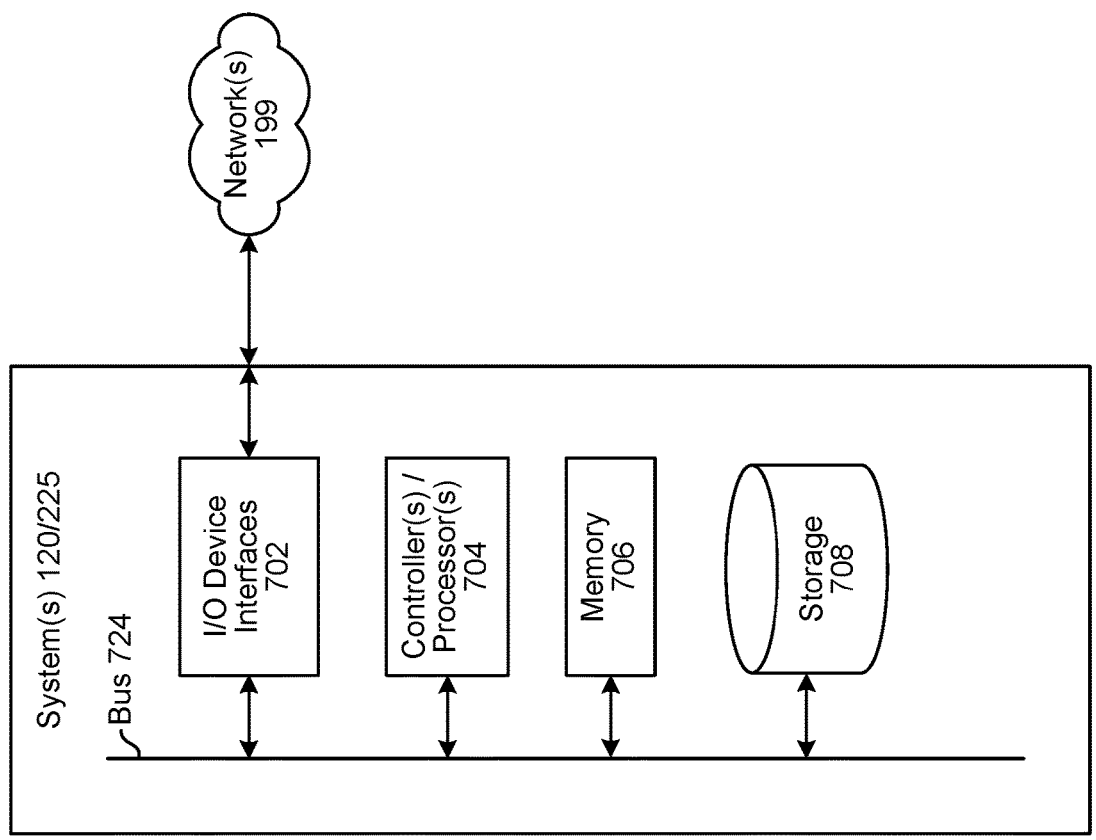
FIG. 7 is a block diagram conceptually illustrating example components of a server according to embodiments of the present disclosure.

FIG. 6 is a block diagram conceptually illustrating a device 110 that may be used with the system. FIG. 7 is a block diagram conceptually illustrating example components of a remote device, such as the system(s) 120, which may assist with ASR processing, NLU processing, etc., and the skill system(s) 225. A system (120/225) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/225) may be included in the overall system of the present disclosure, such as one or more systems 120 for performing ASR processing, one or more systems 120 for performing NLU processing, one or more skill systems 225 for performing actions responsive to user inputs, etc. In operation, each of these systems may include computer-readable and computer-executable instructions that reside on the respective device (120/225), as will be discussed further below.

Each of these devices (110/120/225) may include one or more controllers/processors (704/804), which may each include a central processing unit (CPU) for processing data and computer-readable instructions, and a memory (606/706) for storing data and instructions of the respective device. The memories (606/706) may individually include volatile random access memory (RAM), non-volatile read only memory (ROM), non-volatile magnetoresistive memory (MRAM), and/or other types of memory. Each device (110/120/225) may also include a data storage component (608/708) for storing data and controller/processor-executable instructions. Each data storage component (608/708) may individually include one or more non-volatile storage types such as magnetic storage, optical storage, solid-state storage, etc. Each device (110/120/225) may also be connected to removable or external non-volatile memory and/or storage (such as a removable memory card, memory key drive, networked storage, etc.) through respective input/output device interfaces (602/702).

Computer instructions for operating each device (110/120/225) and its various components may be executed by the respective device's controller(s)/processor(s) (604/704), using the memory (606/706) as temporary "working" storage at runtime. A device's computer instructions may be stored in a non-transitory manner in non-volatile memory (606/706), storage (608/708), or an external device(s). Alternatively, some or all of the executable instructions may be embedded in hardware or firmware on the respective device in addition to or instead of software.

Each device (110/120/225) includes input/output device interfaces (602/702). A variety of components may be connected through the input/output device interfaces (702/802), as will be discussed further below. Additionally, each device (110/120/225) may include an address/data bus (624/724) for conveying data among components of the respective device. Each component within a device (110/120/225) may also be directly connected to other components in addition to (or instead of) being connected to other components across the bus (624/724).

Referring to FIG. 6, the device 110 may include input/output device interfaces 602 that connect to a variety of components such as an audio output component such as a speaker 612, a wired headset or a wireless headset (not illustrated), or other component capable of outputting audio. The device 110 may also include an audio capture component. The audio capture component may be, for example, a microphone 620 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 616 for displaying content. The device 110 may further include a camera 618.

Via antenna(s) 714, the input/output device interfaces 602 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (602/702) may also include communication components that allow data to be exchanged between devices such as different physical servers in a collection of servers or other components.

The components of the device(s) 110, the system(s) 120 or the skill system(s) 225 may include their own dedicated processors, memory, and/or storage. Alternatively, one or more of the components of the device(s) 110, the system(s) 120 or the skill system(s) 225 may utilize the I/O interfaces (602/702), processor(s) (604/704), memory (606/706), and/or storage (608/708) of the device(s) 110 system(s) 120, or the skill system(s) 225, respectively. Thus, the ASR component 250 may have its own I/O interface(s), processor(s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the system(s) 120 and the skill system(s) 225, as described herein, are illustrative, and may be located as a stand-alone device or may be included, in whole or in part, as a component of a larger device or system.

Figure 8:
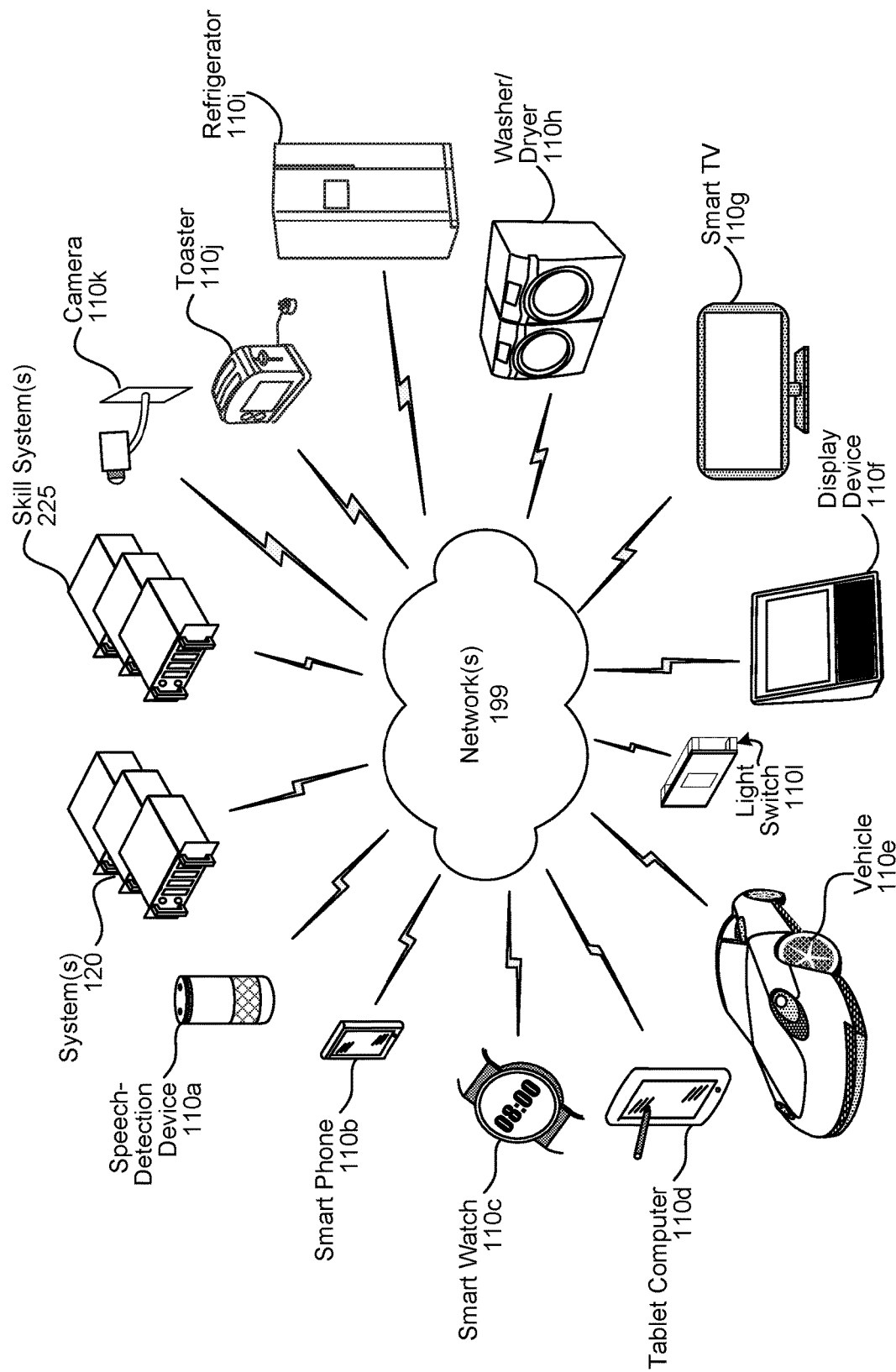
FIG. 8 illustrates an example of a computer network for use with the speech processing system.

As illustrated in FIG. 8, multiple devices (110a-110j, 120, 225) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a display device 110f, a smart television 110g, a washer/dryer 110h, a refrigerator 110i, a toaster 110j, a camera 110k and/or a switch 1101 (e.g., light switch, fan switch, etc.) may be connected to the network(s) 199 through a wireless service provider, over a WiFi or cellular network connection, or the like. Other devices are included as network-connected support devices, such as the system(s) 120, the skill system(s) 225, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 250, the NLU component 260, etc. of one or more systems 120. Data captured by the networked devices 110 may be used by the system(s) 120 to determine user interaction patterns and predict when the user may provide a user input requiring feature generation (e.g., by the prediction component 420). Data captured by the networked devices 110 may also be used to determine a trigger to initiate feature generation (e.g., as the input data 422 by the component 420).

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:
1. A computer-implemented method comprising:
during a first time period:

receiving first data representing a first device name associated with a user profile, the first device name indicating a first user device;

determining a device name embedding using the first data, the device name embedding representing a machine readable representation of the first device name; and storing, in a database, the device name embedding with the user profile;

during a second time period subsequent to the first time period:

receiving input data;

determining, using the input data, that a predicted user input is expected to be received at a future predicted time, the predicted user input corresponding to an intent to operate the first user device represented by the first device name;

determining that a duration of time is required to retrieve the device name embedding from the database causing a latency; and retrieving, at a first time based on the duration of time and prior to the future predicted time, the device name embedding; and during a third time period subsequent to the second time period:

receiving a user input;

determining the user input is associated with the user profile;

processing the user input and the device name embedding using a previously trained model to determine that the user input corresponds to the intent to operate the first user device; and using the device name embedding to determine output responsive to the user input, the output causing operation of the first user device.

2. The computer-implemented method of claim 1, further comprising:

during the second time period:

determining that an output to the predicted user input requires second data corresponding to a second user device, the second data representing a first status of the second user device during a time window;

determining that processing the second data requires a second duration of time causing a latency in responding to the predicted user input;

processing, prior to the future predicted time, the second data to determine third data; and storing the third data; and during the third time period:

wherein using the device name embedding to determine the output further comprises using the third data to determine the output responsive to the user input, the output including the first status of the second user device during the time window.

3. The computer-implemented method of claim 2, further comprising during the second time period:

determining fourth data representing a second status of the second user device during a second time window;

determining that the third data has expired based on the first status being different than the second status;

processing, prior to the future predicted time, the fourth data to determine fifth data; and storing the fifth data.

4. The computer-implemented method of claim 1, further comprising:

processing, using user profile data corresponding to the user profile, first previous user inputs associated with the intent to operate the first user device;

processing, using the user profile data, first state data corresponding to a second user device, the first state data indicating a first past status of the second user device during a first time period;

processing, using the user profile data, second state data corresponding to the second user device, the second state data indicating a second past status of the second user device during a second time period;

determining a trained model representing an interaction pattern of when previous user inputs are received; and processing the input data using the trained model to determine a likelihood of receiving the predicted user input at the future predicted time.

5. A computer-implemented method comprising:

determining that a user input corresponding to a user profile is expected to be received at a future predicted time;

determining that an intent corresponding to the user input is to operate a user device associated with the user profile;

determining a duration of time required to process device name data corresponding to a natural language representation of a name of the user device to determine a device name embedding representing a machine readable representation of the name of the user device;

processing, at a first time based on the duration of time and prior to the future predicted time, the device name data to determine the device name embedding;

storing the device name embedding with the user profile;

receiving input data representing the user input;

determining the input data is associated with the user profile;

processing the input data and the device name embedding using a previously trained model to determine the input data indicates the user device; and determining output data responsive to the user input and corresponding to operation of the user device.

6. The computer-implemented method of claim 5, further comprising:

determining that a second duration of time is required to retrieve the device name embedding from a database causing a delay in responding to the user input; and retrieving the device name embedding prior to the future predicted time.

7. The computer-implemented method of claim 5, further comprising:

determining that first data corresponding to the device name data represents a first status of the user device during a first time window;

receiving second data representing a second status of the user device during a second time window;

determining that the device name embedding stored in a database has expired based on the first status being different than the second status;

processing the second data to determine third data; and storing the third data in the database.

8. The computer-implemented method of claim 5, further comprising:

determining that a response output to the user input requires first data corresponding to the user device, the first data representing a status of the user device during a time window;

determining that processing the first data requires a second duration of time causing a delay in responding to the user input;
processing, prior to the future predicted time, the first data to determine second data; and
storing the second data,
wherein determining the output data further comprises processing the second data to determine the output data.

9. The computer-implemented method of claim 5, further comprising:
processing user input data representing previous user inputs associated with an intent;
determining, using the user input data, a trained model representing an interaction pattern of when previous user inputs are received; and
determining, using the trained model, that the user input is expected at the future predicted time.

10. The computer-implemented method of claim 9, further comprising:
determining that a second user input is expected at a second future predicted time;
receiving a third user input different from the second user input;
processing second user input data associated with the third user input; and
determining, using the trained model and the second user input data, a second trained model representing a second interaction pattern of when user inputs corresponding to the second user input are expected.

11. The computer-implemented method of claim 5, further comprising:
processing, using user device data, first state data corresponding to the user device, the first state data indicating a first past status of the user device during a first time period;
processing, using the user device data, second state data corresponding to the user device, the second state data indicating a second past status of the user device during a second time period;
determining, using the first state data and the second state data, a trained model representing an interaction pattern of when previous user inputs are received; and
determining, using the trained model that the user input is expected at the future predicted time.

12. A system comprising:
at least one processor; and
at least one memory including instructions that, when executed by the at least one processor, cause the system to:
determine that a user input corresponding to a user profile is expected to be received at a future predicted time;
determine that an intent corresponding to the user input is to operate a user device associated with the user profile;
determine a duration of time is required to process device name data corresponding to a natural language representation of a name of the user device to determine a device name embedding representing a machine readable representation of the name of the user device;
process, at a first time based on the duration of time and prior to the future predicted time, the device name data to determine the device name embedding;
store the device name embedding with the user profile;
receive input data representing the user input;
determine the input data is associated with the user profile;
process the input data and the device name embedding using a previously trained model to determine the input data indicates the user device; and
determine output data corresponding to an operation of the user device and responsive to the user input.

13. The system of claim 12, wherein the instructions that, when executed by the at least one processor, further cause the system to:
determine that a second duration of time is required to retrieve the device name embedding from a database causing a delay in responding to the user input; and
retrieve the device name embedding prior to the future predicted time.

14. The system of claim 12, wherein the instructions that, when executed by the at least one processor, cause the system to:
determine that first data corresponding to the device name data represents a first status of the user device during a first time window;
receiving second data representing a second status of the user device during a second time window;
determine that the device name embedding stored in a database has expired, based on the first status being different than the second status,
process the second data to determine third data; and
store the third data in the database.

15. The system of claim 12, wherein the instructions that, when executed by the at least one processor further cause the system to:
determine that a response output to the user input requires first data corresponding to the user device, the first data representing a status of the user device during a time window;
determine that processing the first data requires a second duration of time causing a delay in responding to the user input;
process, prior to the future predicted time, the first data to determine second data; and
store the second data,
wherein the instructions that cause the system to determining the output data further causes the system to process the second data to determine the output data.

16. The system of claim 12, wherein the instructions that, when executed by the at least one processor, further cause the system to:
process user input data representing previous user inputs associated with an intent;
determine, using the user input data, a trained model representing an interaction pattern of when previous user inputs are received; and
determine, using the trained model, that the user input is expected at the future predicted time.

17. The system of claim 16, wherein the instructions that, when executed by the at least one processor, further cause the system to:
determine that a second user input is expected at a second future predicted time;
receive a third user input different from the second user input;
process second user input data associated with the third user input; and
determine, using the trained model and the second user input data, a second trained model representing a second interaction pattern of when user inputs corresponding to the second user input are expected.

18. The system of claim 12, wherein the instructions that, when executed by the at least one processor, further cause the system to:
- process, using user device data, first state data corresponding to the user device, the first state data indicating a first past status of the user device during a first time period;
- process, using the user device data, second state data corresponding to the user device, the second state data indicating a second past status of the user device during a second time period;
- determine, using the first state data and the second state data, a trained model representing an interaction pattern of when previous user inputs are received; and
- determine, using the trained model that the user input is expected at the future predicted time.

* * * * *